(12) United States Patent
Nagano et al.

(10) Patent No.: US 10,054,928 B2
(45) Date of Patent: Aug. 21, 2018

(54) NUMERICAL CONTROLLER

(71) Applicant: FANUC Corporation, Minamitsuru-gun, Yamanashi (JP)

(72) Inventors: Katsunori Nagano, Yamanashi (JP); Motohiko Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/633,010

(22) Filed: Jun. 26, 2017

(65) Prior Publication Data

US 2018/0004184 A1 Jan. 4, 2018

(30) Foreign Application Priority Data

Jun. 30, 2016 (JP) ................. 2016-130246

(51) Int. Cl.
G05B 19/18 (2006.01)
G05B 19/19 (2006.01)

(52) U.S. Cl.
CPC ........... *G05B 19/19* (2013.01); *G05B 19/182* (2013.01); *G05B 2219/36342* (2013.01); *G05B 2219/43031* (2013.01)

(58) Field of Classification Search
CPC ...... G05B 19/19; G05B 19/18; G05B 19/401; G05B 19/402; G05B 2219/43031
See application file for complete search history.

(56) References Cited

U.S. PATENT DOCUMENTS

| 2003/0089204 A1 | 5/2003 | Schreiber et al. |
| 2015/0355621 A1 | 12/2015 | Ikeda et al. |
| 2016/0041545 A1* | 2/2016 | Koide ................. G05B 19/19 700/187 |

FOREIGN PATENT DOCUMENTS

| JP | 3984052 B | 7/2007 |
| WO | 2014155723 A1 | 10/2014 |

OTHER PUBLICATIONS

German Office Action for German Application No. 10 2016 000 409.6, dated Apr. 23, 2018 with translation, 11 pages.
Weck et al., "Werkzeugmaschinen 4—Automatisierung von Maschinen und Anlagen", 2006, 10 pages.
Tschatsch, "Praxis der Zerspantechnik—Verfahren, Werkzeuge, Berechnung", 2005, 53 pages.

* cited by examiner

*Primary Examiner* — Karen Masih
(74) *Attorney, Agent, or Firm* — RatnerPrestia

(57) ABSTRACT

A numerical controller capable of automatically calculating a tool path based on a command of a cutting path in skiving machining includes a command analysis unit that determines whether a block read from a machining program corresponds to a skiving machining command, a skiving machining command data calculation unit that calculates a path and a feed speed of a tool based on a path of a cutting point and a feed speed of the cutting point commanded by the skiving machining command when the command analysis unit determines that the block corresponds to the skiving machining command, and an interpolation unit that calculates interpolation data according to a progress rate of the block during actual machining based on the path of the tool calculated by the skiving machining command data calculation unit and a coordinate value during actual machining.

3 Claims, 10 Drawing Sheets

FIG.2

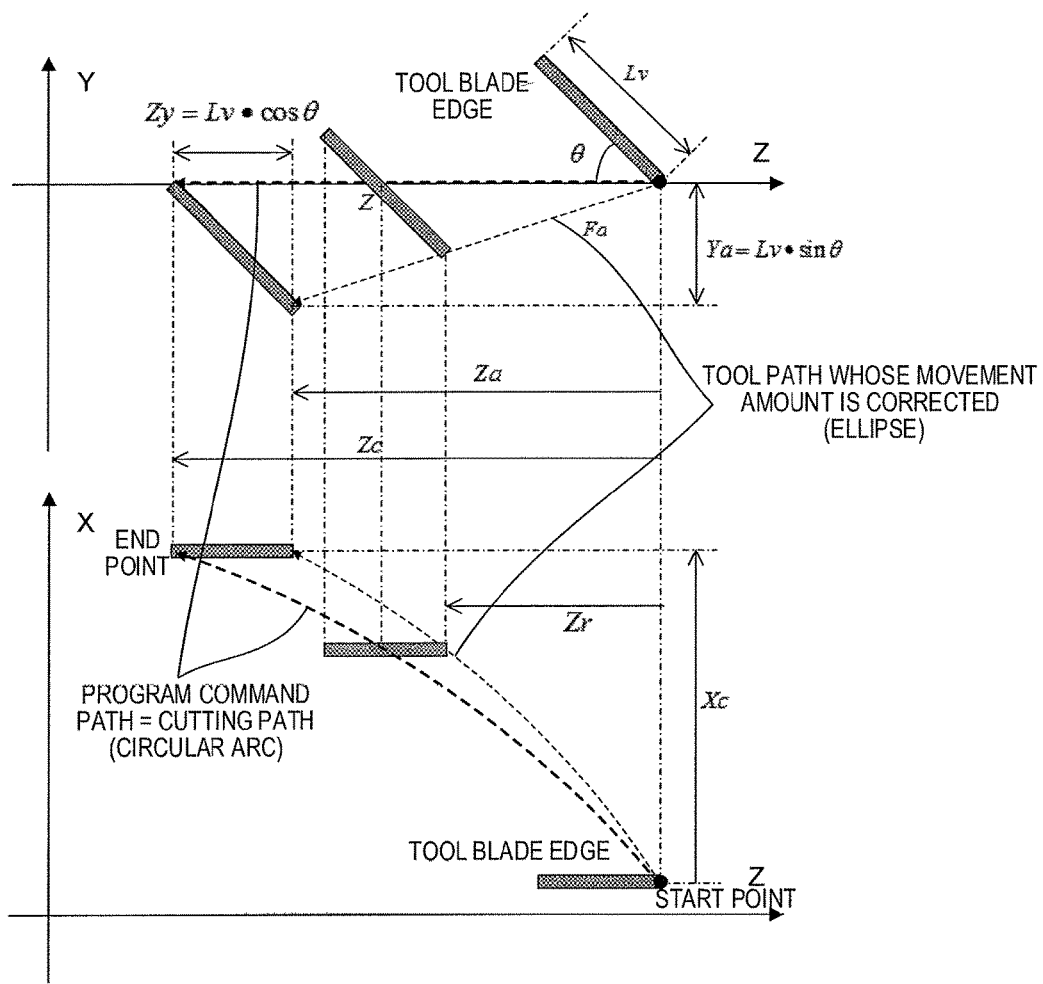

$Lv$ : EFFECTIVE BLADE EDGE LENGTH
$\theta$ : TOOL ANGLE
$Xc$ : X AXIS DIRECTION MOVEMENT COMMAND DISTANCE
$Zc$ : Z AXIS DIRECTION MOVEMENT COMMAND DISTANCE
$Za$ : MOVING DISTANCE AFTER Z AXIS DIRECTION CORRECTION
$Ya$ : MOVING DISTANCE AFTER Y AXIS DIRECTION CORRECTION
$Fc$ : PROGRAM COMMAND SPEED
$Fa$ : TOOL MOVEMENT SPEED
$a$ : Z COORDINATE OF CIRCULAR ARC CENTER OF PROGRAM COMMAND (OTHER THAN ABOVE GRAPH)
$b$ : X COORDINATE OF CIRCULAR ARC CENTER OF PROGRAM COMMAND (OTHER THAN ABOVE GRAPH)
$Z$ : Z AXIS COORDINATE OF CUTTING POINT
$Zr$ : Z AXIS COORDINATE OF TOOL FIG.6
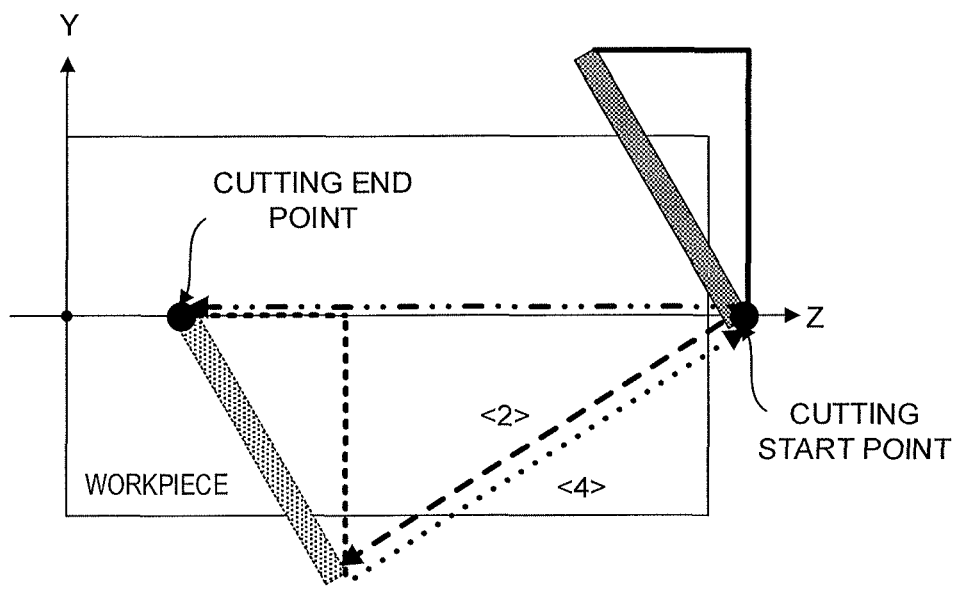
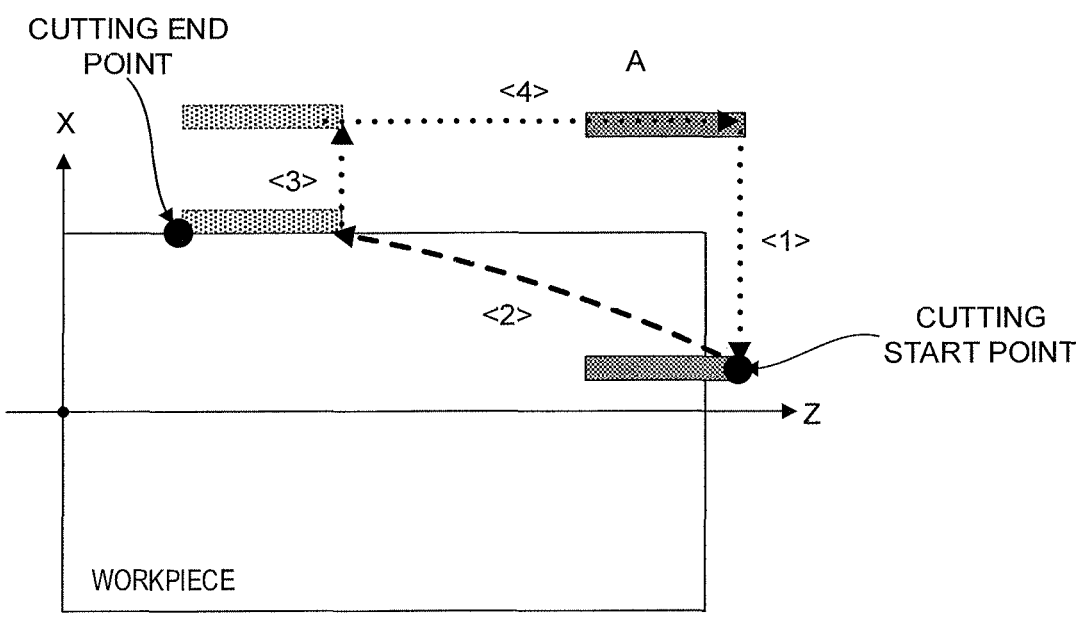
◄ — ·· — ·· —   CUTTING PATH
◄ — — — —   TOOL PATH OF CUTTING FEED
◄ ·········   TOOL PATH OF FAST FORWARD

← · — · · — COMMANDED CUTTING PATH
← — — — — TOOL PATH CORRESPONDING TO COMMAND

← · — · · — COMMANDED CUTTING PATH
← — — — — TOOL PATH CORRESPONDING TO COMMAND $Lv$ : EFFECTIVE BLADE EDGE LENGTH
$\theta$ : TOOL ANGLE
$Xc$ : X AXIS DIRECTION MOVEMENT COMMAND DISTANCE
$Zc$ : Z AXIS DIRECTION MOVEMENT COMMAND DISTANCE
$Za$ : MOVING DISTANCE AFTER Z AXIS DIRECTION CORRECTION
$Ya$ : MOVING DISTANCE AFTER Y AXIS DIRECTION CORRECTION
$Fc$ : PROGRAM COMMAND SPEED
$Fa$ : TOOL MOVEMENT SPEED

FIG.11

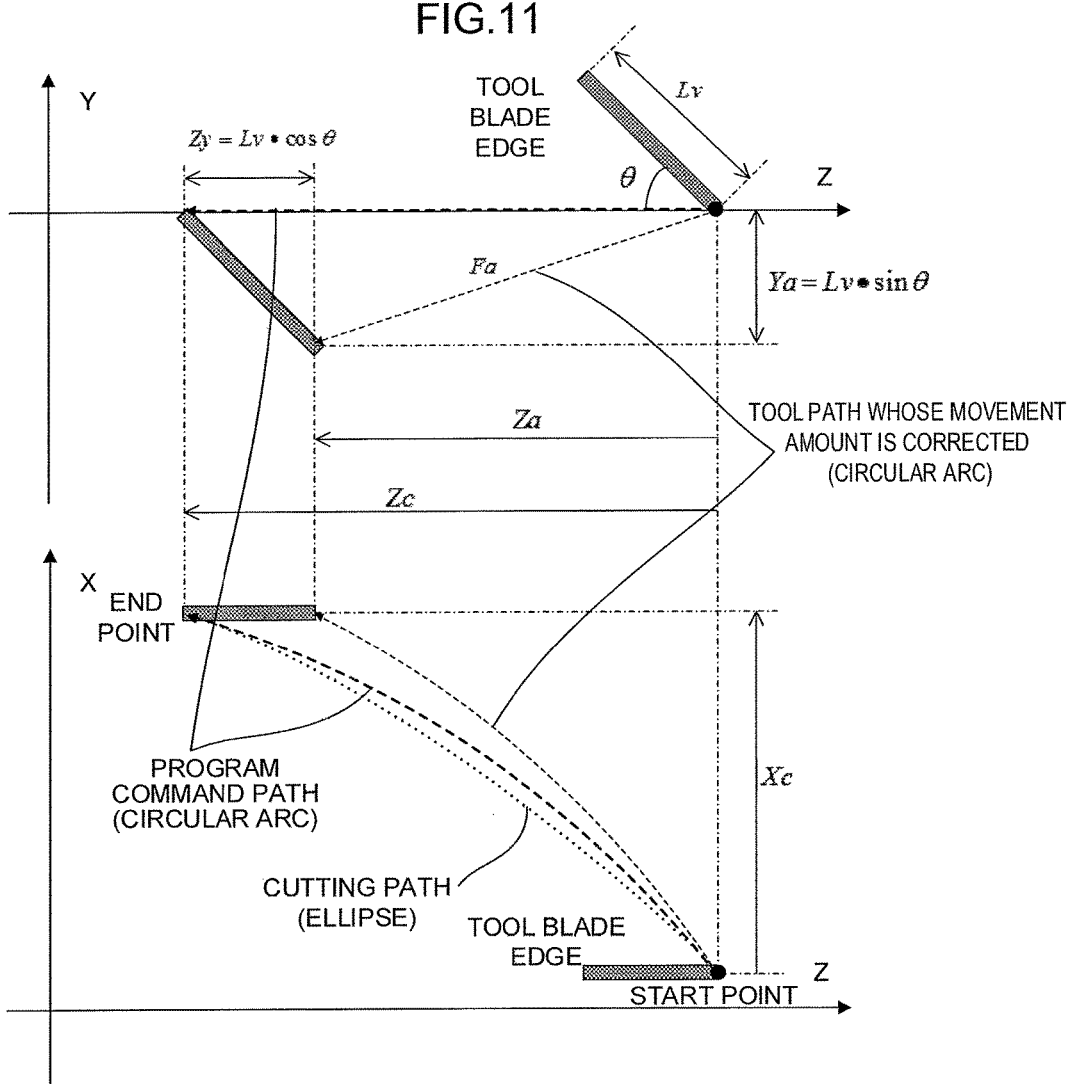

- $Lv$ : EFFECTIVE BLADE EDGE LENGTH
- $\theta$ : TOOL ANGLE
- $Xc$ : X AXIS DIRECTION MOVEMENT COMMAND DISTANCE
- $Zc$ : Z AXIS DIRECTION MOVEMENT COMMAND DISTANCE
- $Za$ : MOVING DISTANCE AFTER Z AXIS DIRECTION CORRECTION
- $Ya$ : MOVING DISTANCE AFTER Y AXIS DIRECTION CORRECTION
- $Fc$ : PROGRAM COMMAND SPEED
- $Fa$ : TOOL MOVEMENT SPEED
- $a$ : Z COORDINATE OF CIRCULAR ARC CENTER OF PROGRAM COMMAND (OTHER THAN ABOVE GRAPH)
- $b$ : X COORDINATE OF CIRCULAR ARC CENTER OF PROGRAM COMMAND (OTHER THAN ABOVE GRAPH)

NUMERICAL CONTROLLER

BACKGROUND OF THE INVENTION

1. Field of the Invention

The present invention relates to a numerical controller, and particularly relates to a numerical controller that performs skiving machining control.

2. Description of the Related Art

Skiving machining refers to a machining method of cutting a workpiece by sending a cutting tool in a tangential direction of the workpiece when the workpiece is cut using the cutting tool (Japanese Industrial Standard (JIS) B0106 0.209). In skiving machining in a turning machine, a workpiece is machined while a Y axis moves using a tool having a straight blade obliquely arranged with respect to a rotation axis of a rotating work (for example, JP 3984052 B2).

When such skiving machining is performed by a conventional numerical controller, movement of a Y axis needs to be commanded in accordance with movement of a Z axis. FIG. 7 is a diagram illustrating a cutting path of cutting work with respect to a workpiece when skiving machining is performed and a movement path of a tool when cutting work is performed along the cutting path. As illustrated in FIG. 7, in the skiving machining, the cutting path of the cutting work with respect to the workpiece is in a direction of a rotation axis (Z axis direction), whereas cutting is performed by moving the tool in a direction in which the straight blade is directed (approximately vertical direction of the straight blade), and thus a tool path corresponds to a direction of a synthetic vector of the Z axis direction and a Y axis direction inclined with respect to the rotation axis direction.

Conventionally, at the time of preparing a skiving machining program, an operator has calculated a Z axis and Y axis movement amount of a tool path commanded by the program such that a cutting path corresponds to the path illustrated in FIG. 7, and prepared the program based on a result of calculation. However, this operation is a heavy burden for the operator. For this reason, it is desired that a numerical controller automatically calculate a tool path when the operator commands the cutting path of skiving machining by the program.

FIG. 8 is a diagram illustrating a relation between a movement amount Zc and a feed speed Fc of a cutting point, and each value related to movement of the tool. Further, FIG. 9 is a diagram illustrating each value related to a blade edge of the tool. When the movement amount of the tool in the Z axis direction is set to Za, the movement amount of the tool in the Y axis direction is set to Ya, and a synthetic feed speed of the tool in the Z axis direction and the Y axis direction is set to Fa at the time of moving the tool such that the movement amount of the cutting point becomes Zc and the feed speed of the cutting point becomes Fc as illustrated in FIG. 8, an effective blade edge length of the tool is set to Lv, and a tool angle is set to θ, a relation to each value can be expressed by the following Equation 1. In this way, the numerical controller can automatically calculate the tool path based on a command of the cutting path in skiving machining using Equation 1.

[Equation 1]

| | |
|---|---|
| Movement amount of tool in Y axis direction | $Ya = Lv \times \sin\theta$ |
| Movement amount of cutting point in Z axis direction in association with movement of tool in Y axis direction | $Zy = Lv \times \cos\theta$ |
| Movement amount of tool in Z axis direction | $Za = Zc - Zy$ |
| Feed speed of tool in Z axis direction | $Fz = Fc - (Zy/Zc) \times Fc$ |
| Feed speed of tool in Y axis direction | $Fy = (Zy/Zc) \times Fc \times \tan\theta$ |
| Synthetic feed speed of tool | $Fa = \sqrt{Fz^2 + Fy^2}$ |

FIG. 10 is a diagram illustrating an example of automatically calculating a tool path based on a command of a cutting path of taper machining by skiving machining when the cutting path is commanded using the above Equation 1. As illustrated in FIG. 10, in the case of performing taper machining by skiving machining, when the movement amounts Zc and Xc of the cutting point and the feed speed Fc are commanded by the program, movement amounts in an X axis direction, the Y axis direction and the Z axis direction and the feed speed are properly corrected, and thus it is possible to obtain a machined shape as programmed.

FIG. 11 is a diagram illustrating an example of automatically calculating a tool path based on a command of a cutting path of circular arc shape machining by skiving machining when the cutting path is commanded using the above Equation 1. As illustrated in FIG. 11, in the case of commanding circular arc shape machining by skiving machining, even when movement amounts in the X axis direction, the Y axis direction and the Z axis direction and a feed speed are corrected in advance using the above Equation 1 to perform circular arc interpolation on the tool path, there is a problem that the cutting path becomes a distorted circular arc shape.

SUMMARY OF THE INVENTION

In this regard, an object of the invention is to provide a numerical controller that does not cause a distortion in a cutting path at the time of machining a circular arc shape, etc. by skiving machining.

In the invention, the above problem is solved by providing a numerical controller, which controls a machine tool that performs skiving machining, with a function of controlling the machine by calculating an actual path and speed of a tool based on a path of a cutting point and a speed of the cutting point commanded by a skiving machining command, tool angle data, tool effective blade edge data, and a block progress rate during actual machining in order to allow specification of a movement path of the cutting point when circular arc shape machining is performed.

Further, the numerical controller according to the invention controls a machine tool that performs skiving machining of cutting a rotationally symmetric surface of a rotating workpiece using a tool based on a machining program, and the machining program is allowed to include a skiving machining command capable of specifying a movement path of a cutting point in the skiving machining. The numerical controller includes a command analysis unit that analyzes the machining program, and determines whether a block read from the machining program corresponds to the skiving machining command, a skiving machining command data calculation unit that calculates a path and a feed speed of the tool based on a path of the cutting point and a feed speed of the cutting point commanded by the skiving machining command when the command analysis unit determines that the block corresponds to the skiving machining command, and an interpolation unit that calculates interpolation data according to a progress rate of the block during actual machining based on the path of the tool calculated by the skiving machining command data calculation unit and a coordinate value during actual machining. Here, the machine tool is controlled based on the interpolation data calculated by the interpolation unit.

The numerical controller according to the invention further includes a tool data storage unit that stores tool angle data indicating an angle of the tool with respect to a rotation axis of the workpiece and tool effective blade edge data indicating an effective blade edge of the tool, in which the skiving machining command data calculation unit calculates an actual path and feed speed of the tool based on the path of the cutting point and the feed speed of the cutting point commanded by the skiving machining command, and the tool angle data and the tool effective blade edge data stored in the tool data storage unit.

In the numerical controller according to the invention, the skiving machining command includes a skiving machining cycle command for commanding a repeated operation of the skiving machining.

According to the invention, an operator can perform machining of various shapes such as a circular arc shape, etc. in addition to taper machining in skiving machining only by commanding a movement path of a cutting point similarly to normal turning without considering particular correction.

Conventionally, at the time of machining a circular arc shape, etc. by skiving machining, the operator has had an extreme difficulty since a tool path for allowing a cutting path to have a desired shape needs to be calculated. However, machining can be easily performed in the invention.

BRIEF DESCRIPTION OF THE DRAWINGS

The above-described object and characteristic of the invention and other objects and characteristics will be clear from description of embodiments below with reference to accompanying drawings. In the drawings:

FIG. 2 is a diagram for description of a method of calculating respective parameters when circular arc shape machining by skiving machining is performed by the numerical controller of the invention;

FIG. 6 is a diagram illustrating movement of a tool at the time of executing a skiving machining cycle command;

FIG. 11 is a diagram illustrating an example of a case in which circular arc shape machining by skiving machining is performed in a conventional art.

DETAILED DESCRIPTION OF THE PREFERRED EMBODIMENTS

Hereinafter, embodiments of the invention will be described with reference to drawings.

In a numerical controller of the invention, when circular arc interpolation is commanded during skiving machining in a machining program, an actual path and speed of a tool are calculated from a path of a cutting point, a speed of the cutting point, tool angle data, tool effective blade edge data, and a block progress rate during actual machining to control a machine. A tool path control scheme considering the block progress rate during actual machining according to the numerical controller of the invention can be applied to not only taper machining and circular arc shape machining by skiving machining but also machining of another shape. Hereinafter, a case in which circular arc shape machining is performed will be described as an example.

Figure 1:
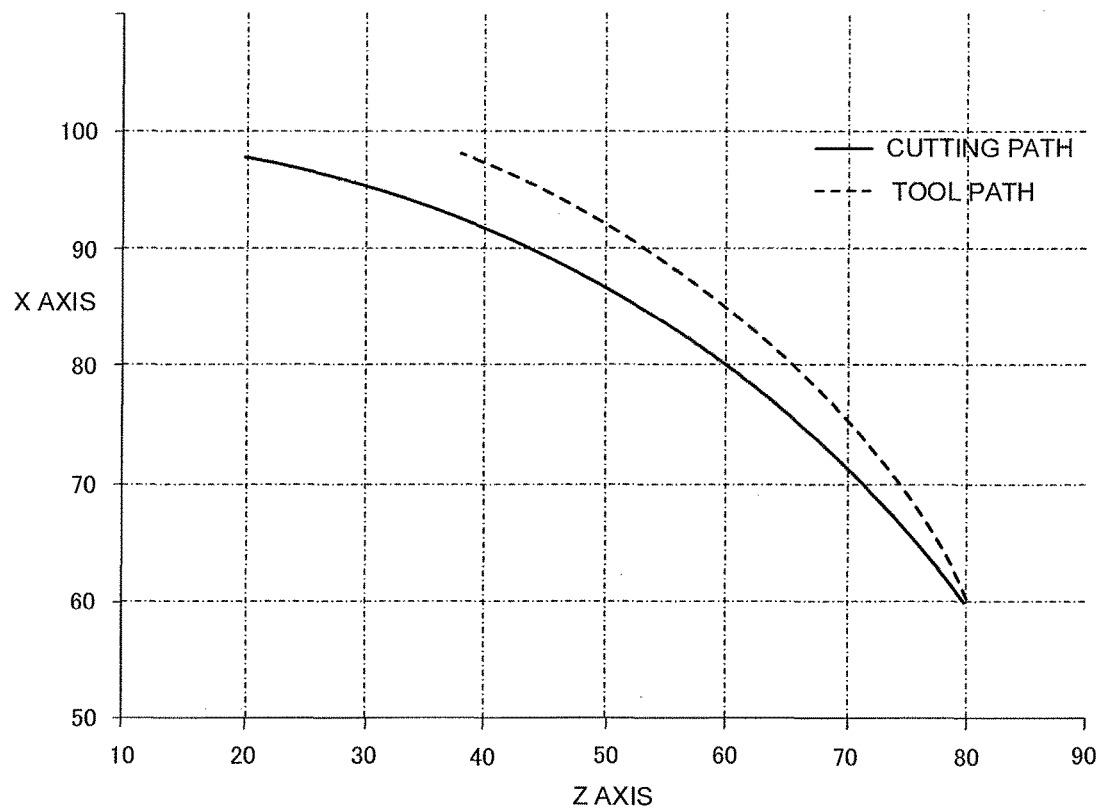
FIG. 1 is a diagram illustrating an example of a machining program executed by a numerical controller of the invention, a cutting path commanded by the machining program, and a tool path obtained by correcting the cutting path.

FIG. 1 is a diagram illustrating an example of a machining program executed by the numerical controller of the invention, a cutting path commanded by the machining program, and a tool path obtained by correcting the cutting path. In the machining program illustrated in FIG. 1, an effective blade edge length Lv of a tool and a tool angle θ are not commanded, and these values are set in advance in the numerical controller. However, these values may be allowed to be directly commanded by a command in the machining program. A circular arc command commanded by a block N30 of the machining program illustrated in FIG. 1 is a finished shape, and an operator may not take correction into consideration when performing skiving machining. A command that the operator is aware of corresponds to only a skiving mode start command of a block N20 and a skiving mode end command of a block N40. In this example, mode start/end is taken as an example in consideration of a skiving machining mode. However, a command to perform skiving machining in only one block may be created considering one shot. In addition, in this example, a ZX plane (G18) is selected on the assumption of turning.

As illustrated in FIG. 1, when the numerical controller of the invention is informed of skiving machining in the block N20, the numerical controller corrects a movement amount in a Y axis based on an effective blade edge length Lv of the tool and an angle θ of the tool. With regard to a circular arc on the XZ plane, circular arc interpolation for skiving machining is performed based on an equation described below to control the tool. In this way, the tool corresponds to a distorted circular arc-shaped path indicated by a broken line of FIG. 1. However, since the cutting point corresponds to a path indicated by a solid line, a machined shape becomes a circular arc without distortion. Since a feed speed is corrected, the feed speed of the tool is obtained in accordance with a machining program command.

Hereinafter, a detailed description will be given of correction of circular arc shape machining by skiving machining in the numerical controller of the invention with reference to FIG. 2. In description below, circular arc interpolation on the ZX plane on the assumption of turning will be given as an example. However, calculation may be similarly performed on another plane.

A Z axis coordinate zr of the tool is obtained by adding a Z axis direction component of the effective blade edge length Lv of the tool taking a block progress rate into consideration to a Z axis coordinate z of the cutting point, and thus is calculated by the following Equation 2. In Equation 2, θ is an inclination angle of the tool.

$$zr = z + Lv \times \cos\theta \times \text{block progress rate} \quad \text{[Equation 2]}$$

The block progress rate is an execution ratio of a block calculated from a coordinate value and a movement amount in the Y axis as shown in Equation 3 below. In circular arc interpolation on the ZX plane, the Y axis linearly operates irrespective of the circular arc interpolation and thus, is suitable for ratio calculation.

$$\text{Block progress rate} = |(\text{current coordinate} - \text{start point coordinate})/\text{moving distance}| \quad \text{[Equation 3]}$$

On the ZX plane on which circular arc interpolation is commanded, a circular arc path of the cutting point is calculated from a start point/end point and a circular arc radius or a center position specified by the machining program. When circular arc center coordinates specified by the machining program are set to (a, b) and the circular arc radius is set to r, a circular arc shape can be expressed by the following Equation (4).

$$(z-a)^2 + (x-b)^2 = r^2 \quad \text{[Equation 4]}$$

When the above Equation 4 is solved for z, Equation 5 shown below is obtained.

$$z = \pm\sqrt{r^2 - (x-b)^2} + a \quad \text{[Equation 5]}$$

Then, when the above Equation 5 is substituted into Equation 2, the Z axis coordinate zr of the tool in the circular arc interpolation can be expressed by the following Equation 6.

$$zr = \pm\sqrt{r^2 - (x-b)^2} + a + Lv \times \cos\theta \times \text{block progress rate} \quad \text{[Equation 6]}$$

In the numerical controller of the invention, the tool may be controlled in accordance with the above Equation 6. As a result of controlling in this way, the path of the cutting point becomes the circular arc shape as specified by the machining program. In the case of taper machining by skiving machining, an expression of the Z axis coordinate z of the cutting point merely corresponds to a linear expression with respect to an X axis coordinate x such as z=ax+c, and an expression of the tool is similarly obtained. Therefore, the tool may be controlled according to the equation. As a result, the path of the cutting point becomes a taper as specified by the machining program.

In addition, with regard to the feed speed, when a velocity component in an X axis direction is included in consideration of the taper machining and the circular arc interpolation, Equation 7 below is obtained. In this way, when the tool is controlled at a speed Fa, machining is performed while the speed of the cutting point corresponds to the speed Fc commanded by the machining program. A movement amount Za of the tool in a Z axis direction and a movement amount Ya of the tool in a Y axis direction are as shown in Equation 1.

$$Fa = Fc \frac{\sqrt{Za^2 + Ya^2 + Xc^2}}{\sqrt{Zc^2 + Xc^2}} \quad \text{[Equation 7]}$$

Hereinafter, a description will be given of a configuration of the numerical controller of the invention which controls the tool using the above-described respective equations.

Figure 3:
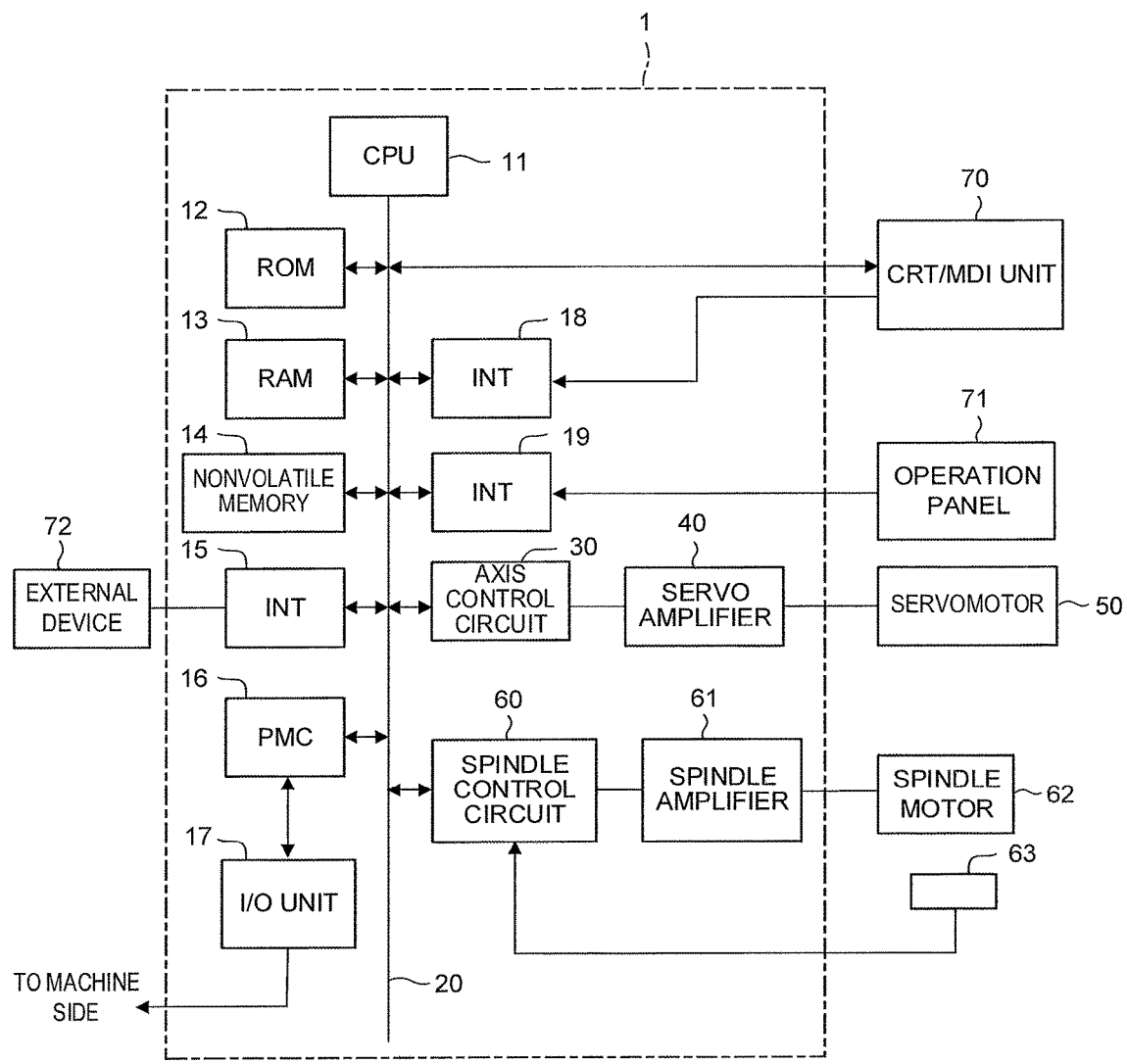
FIG. 3 is a hardware configuration diagram illustrating a main part of the numerical controller according to an embodiment of the invention.

FIG. 3 is a hardware configuration diagram illustrating a numerical controller according to an embodiment of the invention and a main part of a machine tool driven and controlled by the numerical controller. A central processing unit (CPU) 11 included in a numerical controller 1 is a processor that controls the numerical controller 1 as a whole. The CPU 11 reads a system program stored in a read only memory (ROM) 12 via a bus 20, and controls the whole numerical controller 1 according to the system program. A random access memory (RAM) 13 stores temporary calculation data or display data, various data input by the operator via a cathode ray tube/manual data input (CRT/MDI) unit 70, etc.

A nonvolatile memory 14 is configured as a memory that maintains a memory state even when a power supply of the numerical controller 1 is turned OFF, for example, by being backed up by a battery (not illustrated). The nonvolatile memory 14 stores a machining program described below read through an interface 15 or a machining program input through the CRT/MDI unit 70. The nonvolatile memory 14 further stores a machining program running program used to run the machining program, an axis control program, etc., and these programs are developed in the RAM 13 at the time of execution. In addition, various system programs for carrying out processing of an edit mode required to create and edit the machining program, etc. are written to the ROM 12 in advance. Various machining programs such as the machining program for carrying out the invention can be input through the interface 15 or the CRT/MDI unit 70, and stored in the nonvolatile memory 14.

The interface 15 is an interface for connecting the numerical controller 1 and an external device 72 such as an adapter to each other. The machining program and various parameters are read from the external device 72 side. In addition, the machining program edited in the numerical controller 1 can be stored in external storage means via the external device 72. A programmable machine controller (PMC) 16 outputs a signal to a peripheral device (for example, an actuator such as a robot hand for replacing the tool) of the machine tool through an input/output (I/O) unit 17 to control the peripheral device by a sequence program stored in the numerical controller 1. In addition, the PMC 16 receives signals of various switches of a control panel installed in a main body of the machine tool, etc. to perform necessary signal processing, and then delivers the signals to the CPU 11.

The CRT/MDI unit 70 is a manual data input device including a display, a keyboard, etc., and an interface 18 receives a command and data from the keyboard of the CRT/MDI unit 70 and delivers the command and data to the CPU 11. An interface 19 is connected to an operation panel 71 including a manual pulse generator, etc.

An axis control circuit 30 for controlling an axis of the machine tool receives a commanded amount of movement of the axis from the CPU 11 and outputs the command for the axis to a servo amplifier 40. The servo amplifier 40 receives this command, and drives a servomotor 50 that moves the axis included in the machine tool. The servomotor 50 of the axis incorporates a position/speed detector, and feeds back a position/speed feedback signal from the position/speed detector to the axis control circuit 30 to perform position/speed feedback control.

In the hardware configuration diagram of FIG. 3, only one axis control circuit 30, one servo amplifier 40, and one servomotor 50 are illustrated. However, in practice, the number of each of axis control circuits 30, servo amplifiers 40, and servomotors 50 prepared in the machine tool corresponds to the number of axes. In addition, feedback of a position/speed from the servomotor 50 is omitted in FIG. 3.

A spindle control circuit 60 receives a main axis rotation command to the machine tool and outputs a spindle speed signal to a spindle amplifier 61. The spindle amplifier 61 receives the spindle speed signal to rotate a spindle motor 62 of the machine tool at a commanded rotation speed, thereby driving the tool.

A position coder 63 is coupled to the spindle motor 62 using a gear, a belt, etc., the position coder 63 outputs a feedback pulse in synchronization with rotation of the main axis, and the feedback pulse is read by the CPU 11.

Figure 4:
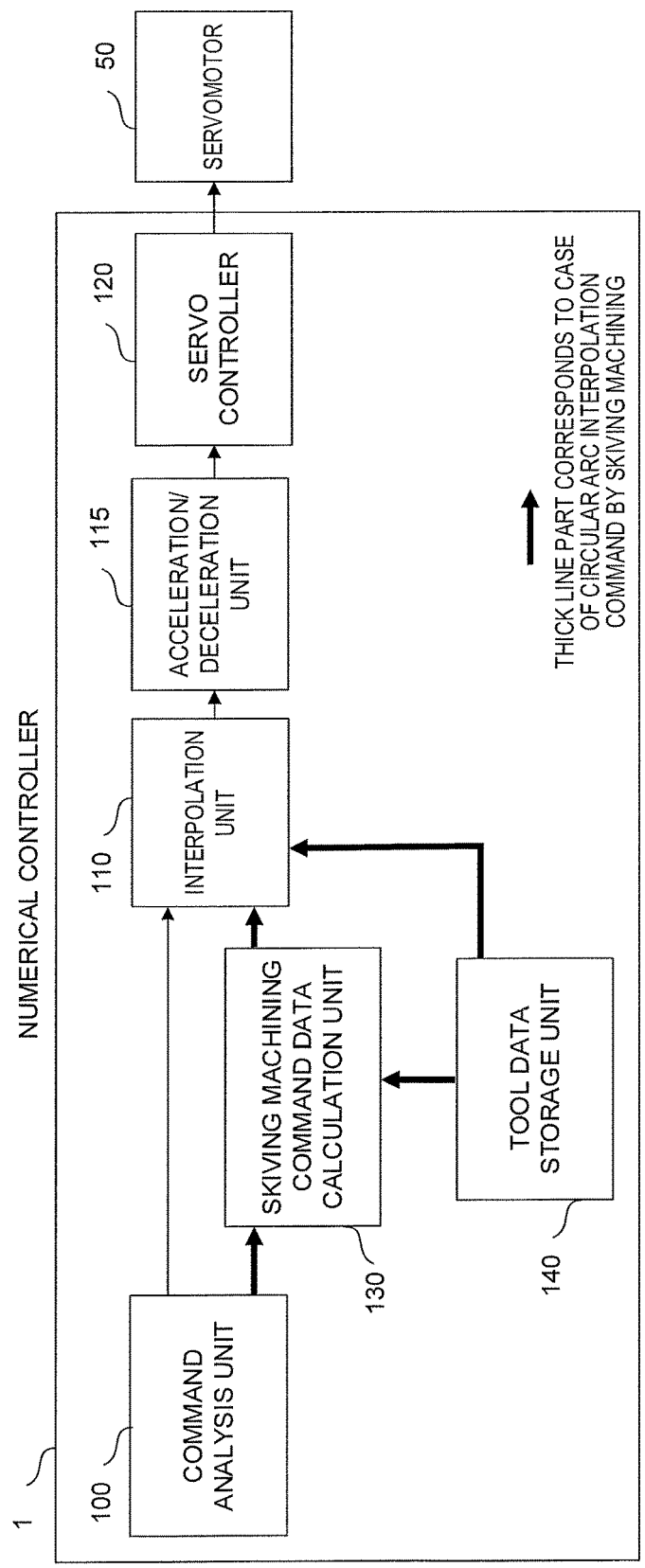
FIG. 4 is a schematic function block diagram of the numerical controller according to an embodiment of the invention.

FIG. 4 illustrates a schematic function block diagram according to an embodiment corresponding to a case in which a function of correcting a tool path at the time of executing a machining command by skiving machining provided by the invention is implemented in the numerical controller 1 illustrated in FIG. 3 by the system program. Each functional means illustrated in FIG. 4 is implemented when the CPU 11 illustrated in FIG. 3 executes the system program to provide each function. A thick line arrow of FIG. 4 indicates a flow of data at the time of processing the machining command by the skiving machining.

The numerical controller 1 of the invention includes a command analysis unit 100, an interpolation unit 110, a servo controller 120, a skiving machining command data calculation unit 130, and a tool data storage unit 140.

The command analysis unit 100 successively reads blocks of the machining program stored in a memory (not illustrated), and analyzes the read blocks. When a read block corresponds to a normal command as a result of analysis, the command analysis unit 100 generates command data based on an analysis result as usual and outputs the generated command data to the interpolation unit 110. When a read block corresponds to a block of a machining command by skiving machining (for example, a circular arc interpolation command for performing circular arc shape machining), the command analysis unit 100 outputs command data commanded by the block to the skiving machining command data calculation unit 130.

The interpolation unit 110 performs interpolation processing on command data output by the command analysis unit 100 or the skiving machining command data calculation unit 130, and generates interpolation data as a point for each interpolation cycle of each axis. In addition, an acceleration/deceleration unit 115 adjusts a speed at each interpolation point by performing acceleration/deceleration processing on the generated interpolation data, and outputs the adjusted interpolation data to the servo controller 120 that controls each servomotor 50. At the time of performing interpolation processing on the command data output by the skiving machining command data calculation unit 130, the interpolation unit 110 performs interpolation processing while obtaining an interpolation point according to a progress rate of a block during actual machining so that distortion is not generated in the shape of the cutting path.

The servo controller 120 drives the servomotor 50 based on the interpolation data input from the interpolation unit 110 to relatively move the workpiece and the tool.

The skiving machining command data calculation unit 130 calculates a tool path and a feed speed using the above respective equations based on command data of the machining command by skiving machining (for example, the circular arc interpolation command for performing circular arc shape machining) input from the command analysis unit 100, generates command data of the tool based on a result of calculation, and outputs the generated command data to the interpolation unit 110. The numerical controller 1 of the present embodiment is provided with the tool data storage unit 140 that stores tool data such as the tool angle and the effective blade edge length with respect to the tool, and the skiving machining command data calculation unit 130 performs calculation using the tool data acquired from the tool data storage unit 140.

The tool data stored in the tool data storage unit 140 can be set by the operator via input means (not illustrated) such as the operation panel at the time of starting machining, or set by a command of the machining program. Alternatively, the tool data can be set by automatically acquiring tool data of the tool attached to the machine tool.

Figure 5:
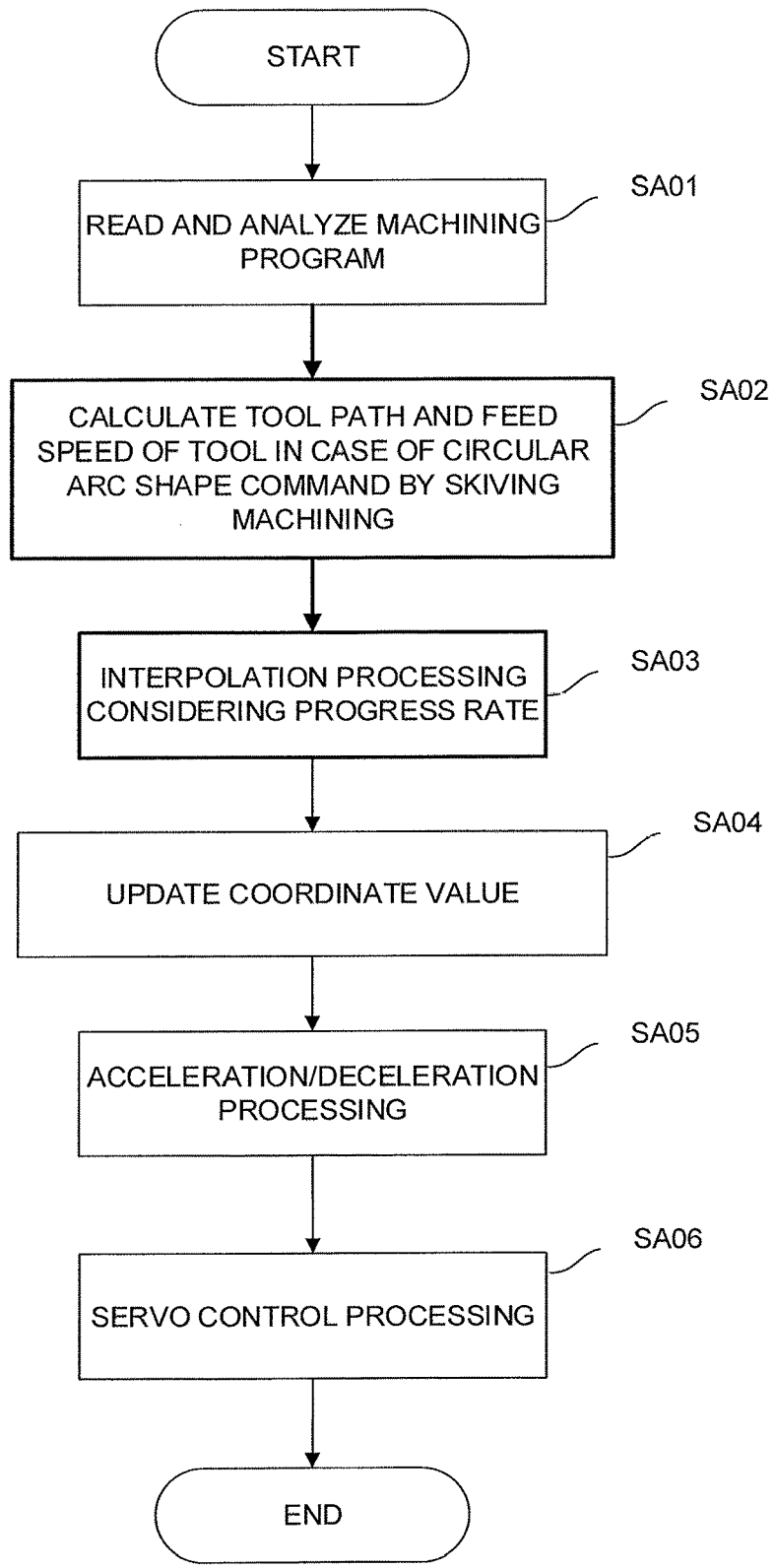
FIG. 5 is a schematic flowchart of processing performed in the numerical controller according to an embodiment of the invention.
Figure 7:
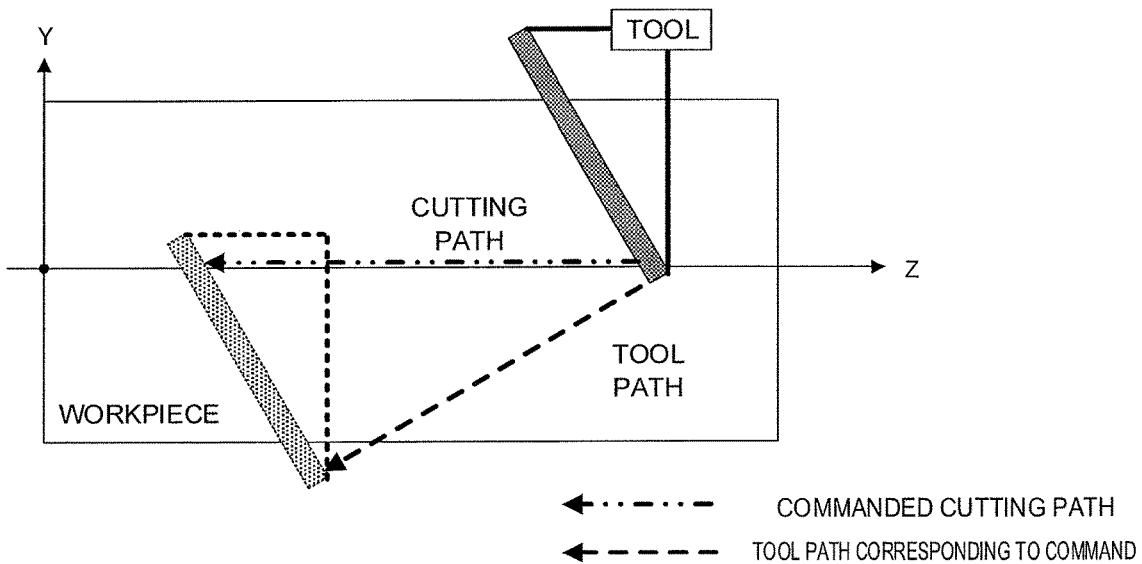
FIG. 7 is a diagram illustrating a cutting path of cutting work with respect to a workpiece when skiving machining is performed and a movement path of the tool when cutting work is performed along the cutting path.
Figure 8:
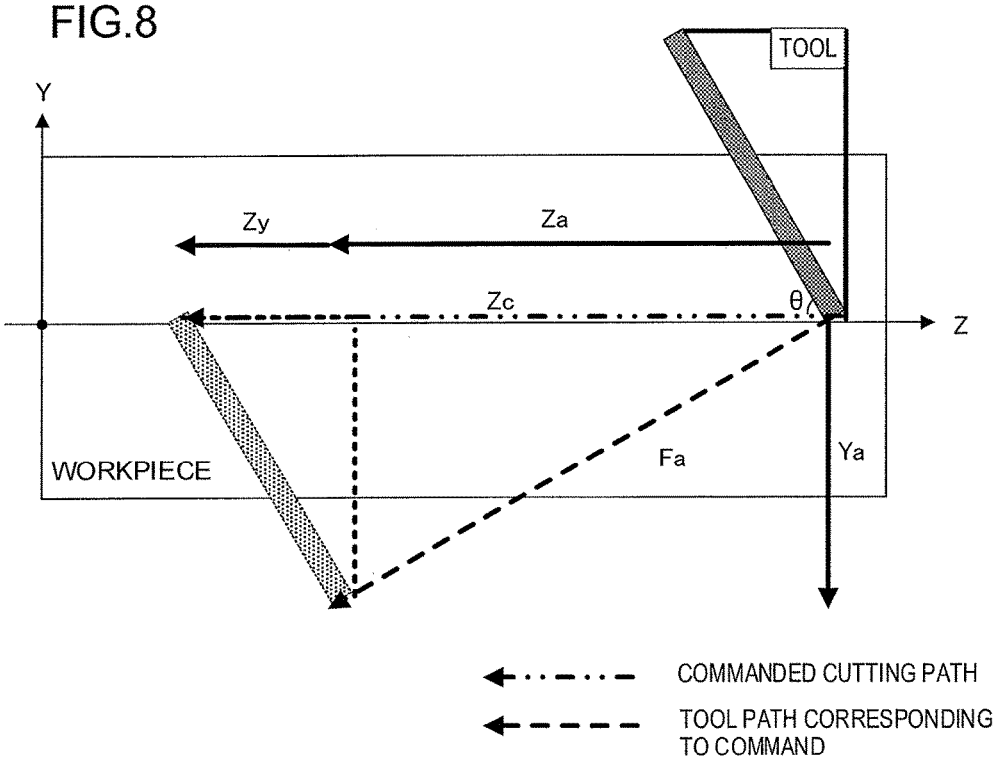
FIG. 8 is a diagram illustrating a relation between a movement amount and a feed speed of a cutting point in skiving machining, and each value related to movement of the tool.
Figure 9:
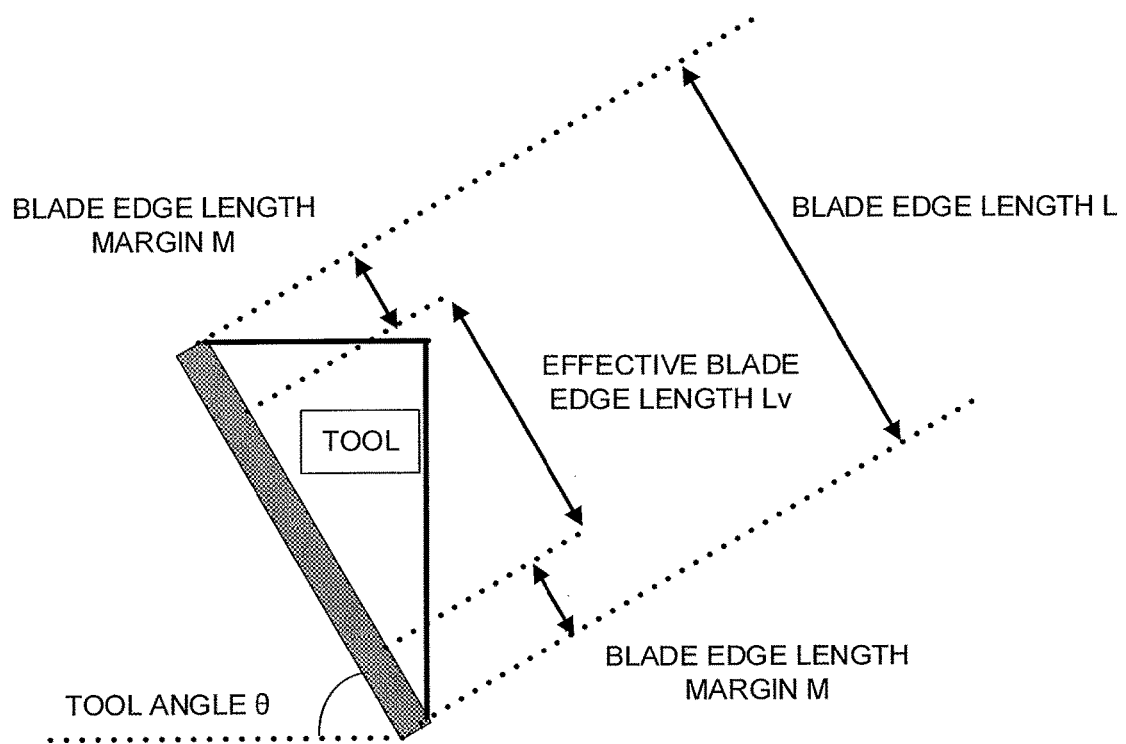
FIG. 9 is a diagram illustrating each value related to a blade edge of the tool used in skiving machining.
Figure 10:
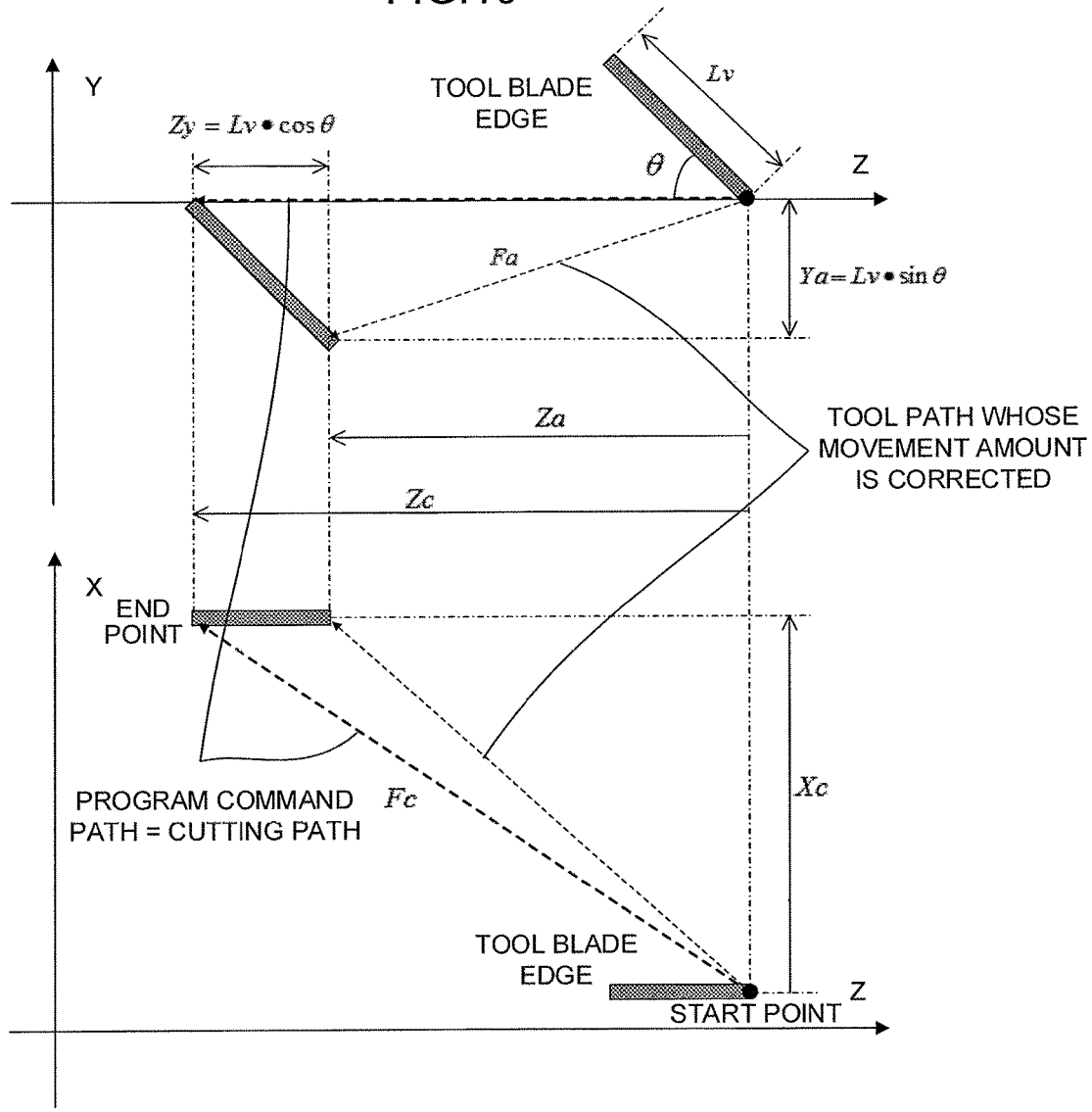
FIG. 10 is a diagram illustrating an example of a case in which taper machining by skiving machining is performed in a conventional art.

FIG. 5 is a flowchart of processing a machining command by skiving machining in the numerical controller 1 according to an embodiment of the invention. In FIG. 5, processes (steps SA02, SA03) indicated by a thick line box shows processes added by the invention.

[Step SA01] The command analysis unit 100 reads and analyzes the command block of the machining program from the memory (not illustrated), and generates the command data. When the analyzed block is a machining command by skiving machining, the command data is output to the skiving machining command data calculation unit 130 to command calculation of the tool path.

[Step SA02] The skiving machining command data calculation unit 130 calculates the tool path and the feed speed of the tool using the above respective equations based on the command data input from the command analysis unit 100 and the data acquired from the tool data storage unit 140, and generates corrected command data based on a result of calculation.

[Step SA03] The interpolation unit 110 performs interpolation processing of generating interpolation data as a point for each interpolation cycle of each axis based on the corrected command data generated in step SA02. At the time of interpolation processing, interpolation processing is performed while obtaining an interpolation point according to a progress rate of a block during actual machining so that distortion is not generated in the shape of the cutting path.

[Step SA04] The interpolation unit 110 updates a coordinate value (position) of a control axis based on the interpolation data.

[Step SA05] The acceleration/deceleration unit 115 performs acceleration/deceleration processing of adjusting a speed at each interpolation point of the interpolation data.

[Step SA06] The servo controller 120 drives the servomotor 50 based on the interpolation data adjusted in step SA05 to relatively move the workpiece and the tool.

Hereinbefore, a description has been given of an operation of the numerical controller 1 based on a skiving machining command. However, skiving machining is continuously performed by repeatedly operating the tool in many cases. In this regard, in the invention, a cycle command of skiving machining is introduced in addition to a skiving machining command for commanding a single operation. For example, the cycle command of skiving machining is given as below in the case of a circular arc interpolation command for machining a circular arc shape.

Gxx X_ Z_ R_ F_;

X_, Z_: cutting end point of circular arc shape machined by skiving machining

R_: radius of circular arc shape machined by skiving machining

F_: feed speed of cutting point performing skiving machining

In the invention, when a command is given to perform skiving machining in a cycle, the tool is moved to a cutting start point in advance, and then a cutting end point (X_Z_), a radius (R_) of a circular arc shape, and a cutting feed speed (F_) at the cutting point are commanded using the above-described cycle command of skiving machining.

FIG. 6 is a diagram illustrating movement of the tool when the skiving machining cycle command is executed. An upper part of FIG. 6 illustrates movement of the tool when the workpiece is viewed from the X axis direction, and a lower part of FIG. 6 illustrates movement of the tool when the same workpiece is viewed from the Y axis direction. In FIG. 6, <1> to <4> indicate operations of the tool. Each of the operations of the tool will be described below.

Operation <1>: The tool is moved fast forward up to the cutting start point. At the same time, the Y axis is moved fast forward up to a skiving machining start position.

Operation <2>: Movement of the X axis, the Y axis, and the Z axis are controlled based on the movement amount and the feed speed of the cutting point similarly to the case of the skiving machining command for commanding the single operation.

Operation <3>: The X axis is moved fast forward to separate the tool from the workpiece.

Operation <4>: Moves fast forward up to start positions of the Z axis and Y axis.

When such a skiving machining cycle command is introduced, the operator may easily prepare a program for commanding skiving machining in a cycle.

Hereinbefore, even though the embodiments of the invention have been described so far, the invention is not limited to only examples of the above-described embodiments, and can be implemented in various modes by making appropriate modifications.

For example, even though the skiving machining command data calculation unit 130 has been described as independent function means in description of the function block diagram of FIG. 4, the skiving machining command data calculation unit 130 may be mounted as function means belonging to the command analysis unit 100.

Hereinbefore, even though the embodiments of the invention have been described, the invention is not limited to examples of the above-described embodiments, and can be implemented in another mode by making appropriate modifications.

The invention claimed is:

1. A numerical controller controlling a machine tool that performs skiving machining of cutting a rotationally symmetric surface of a rotating workpiece using a tool based on a machining program, the machining program being allowed to include a skiving machining command capable of specifying a movement path of a cutting point in the skiving machining, the numerical controller comprising:
   a command analysis unit that analyzes the machining program, and determines whether a block read from the machining program corresponds to the skiving machining command;
   a skiving machining command data calculation unit that calculates a path and a feed speed of the tool based on a path of the cutting point and a feed speed of the cutting point commanded by the skiving machining command when the command analysis unit determines that the block corresponds to the skiving machining command; and
   an interpolation unit that calculates interpolation data according to a progress rate of the block during actual machining based on the path of the tool calculated by the skiving machining command data calculation unit and a coordinate value during actual machining,
   wherein the machine tool is controlled based on the interpolation data calculated by the interpolation unit.

2. The numerical controller according to claim 1, further comprising
   a tool data storage unit that stores tool angle data indicating an angle of the tool with respect to a rotation axis of the workpiece and tool effective blade edge data indicating an effective blade edge of the tool,
   wherein the skiving machining command data calculation unit calculates an actual path and feed speed of the tool based on the path of the cutting point and the feed speed of the cutting point commanded by the skiving machining command, and the tool angle data and the tool effective blade edge data stored in the tool data storage unit.

3. The numerical controller according to claim 1, wherein the skiving machining command includes a skiving machining cycle command for commanding a repeated operation of the skiving machining.

* * * * *